United States Patent [19]
Fulterer

[11] Patent Number: 6,039,421
[45] Date of Patent: Mar. 21, 2000

[54] PULL-OUT DEVICE

[75] Inventor: Manfred Fulterer, Lustenau, Austria

[73] Assignee: Fulterer Gesellschaft m.b.H., Lustenau, Austria

[21] Appl. No.: 09/267,332

[22] Filed: Mar. 12, 1999

[30] Foreign Application Priority Data

Mar. 12, 1998 [AT] Austria ........................ 441/98

[51] Int. Cl.$^7$ ............................. A47B 88/00; B60P 1/00
[52] U.S. Cl. .................. 312/333; 312/334.13; 414/522
[58] Field of Search .................. 312/330.1, 332.1, 312/333, 334.8, 334.12, 334.13, 348.6; 414/522, 462; 296/26.09, 37.6

[56] References Cited

U.S. PATENT DOCUMENTS

| | | | |
|---|---|---|---|
| 1,736,108 | 11/1929 | Anderson et al. | 312/334.13 X |
| 1,902,795 | 3/1933 | Wolters | 312/334.13 X |
| 2,242,958 | 5/1941 | O'Connor | 312/332.1 X |
| 2,739,027 | 3/1956 | Gussack | 312/333 |
| 3,006,487 | 10/1961 | Gelli | 414/522 |
| 3,367,732 | 2/1968 | Beye | 312/332.1 |
| 3,700,301 | 10/1972 | Boeck | 312/333 |
| 4,351,575 | 9/1982 | Rock et al. | 312/334.12 X |
| 4,573,731 | 3/1986 | Knaack et al. | 312/334.8 X |
| 4,681,360 | 7/1987 | Peters et al. | 296/37.6 |
| 4,950,123 | 8/1990 | Brockhaus | 414/522 |
| 5,513,941 | 5/1996 | Kulas et al. | 414/522 |
| 5,564,767 | 10/1996 | Strepek | 296/26.09 |

FOREIGN PATENT DOCUMENTS

| | | | |
|---|---|---|---|
| 314176 | 5/1989 | European Pat. Off. | |
| 2105296 | 3/1983 | United Kingdom | 414/522 |

*Primary Examiner*—Peter M. Cuomo
*Assistant Examiner*—James O. Hansen
*Attorney, Agent, or Firm*—Brown & Wood, LLP

[57] ABSTRACT

A pull-out device including at least one carcass rail and at least one pull-out rail forming together a rail pair; and a blocking device for retaining the carcass and pull-out rails in their respective relative position and having a stationary tooth rack which extends parallel to the rails, a tooth segment engageable with the tooth rack for blocking displacement of the at least one pull-out rail relative to the carcass rail, a first box-shaped rail for receiving the tooth rack and having its rear end connected with the carcass rail, and a second profiled rail telescopically displaceable in the box-shaped rail and having its front end connected with the at least one pull-out rail, with both the tooth rack and the tooth segment being located within the second rail, and with the tooth segment being arranged in the rear section of the second rail.

19 Claims, 3 Drawing Sheets

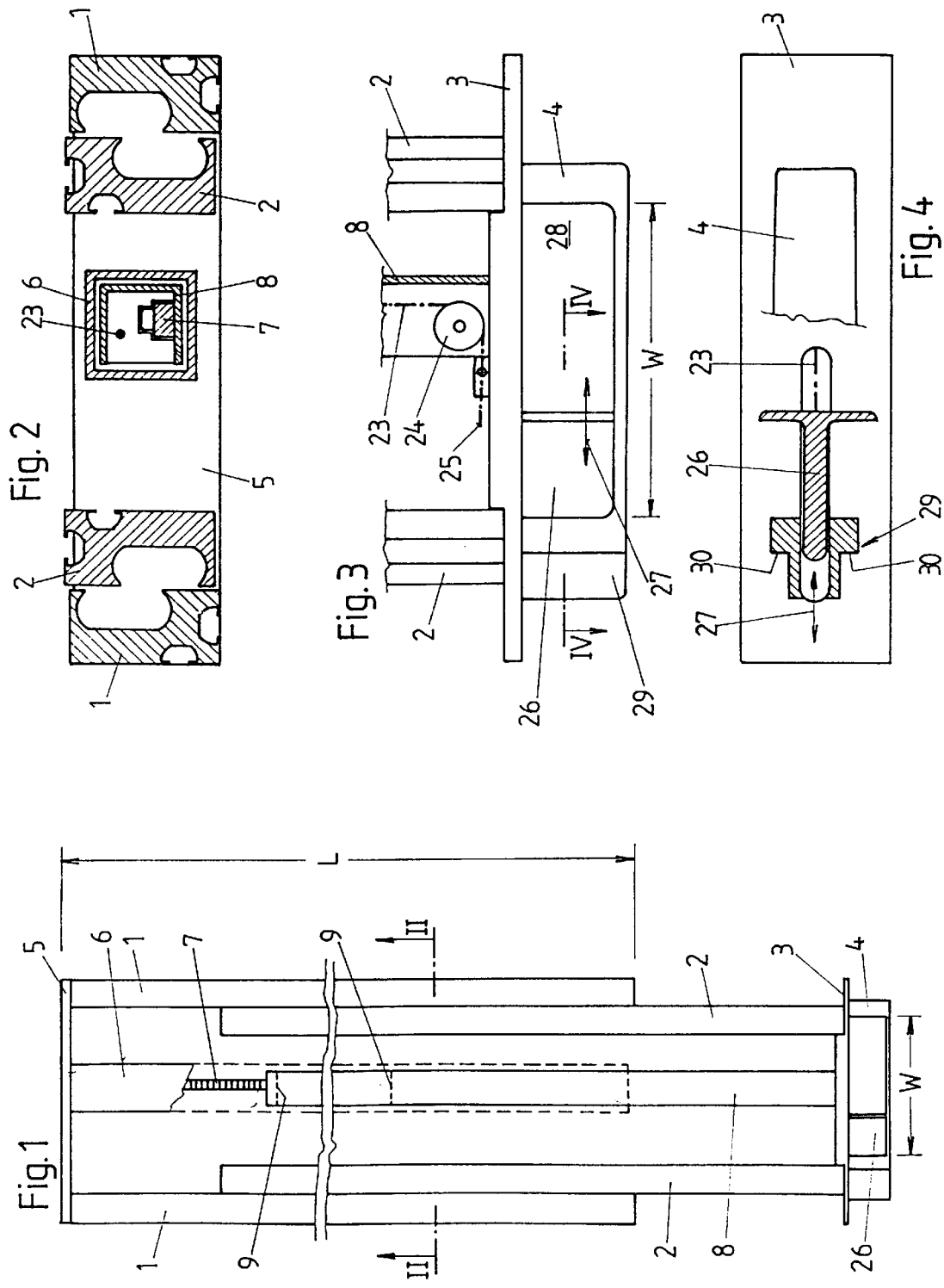

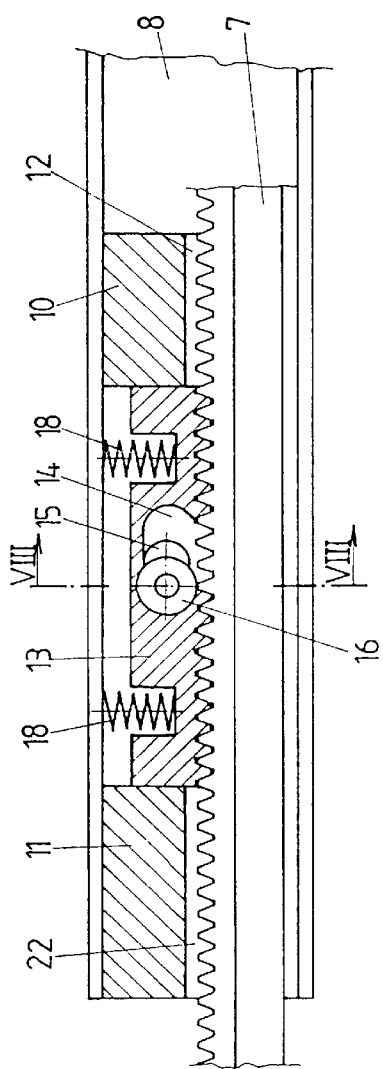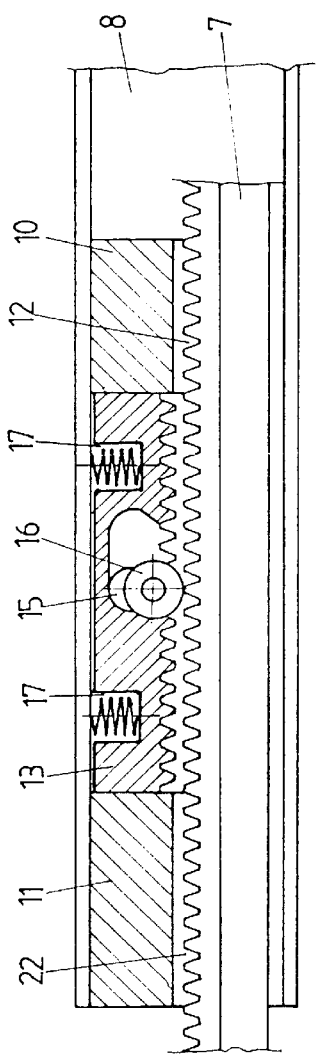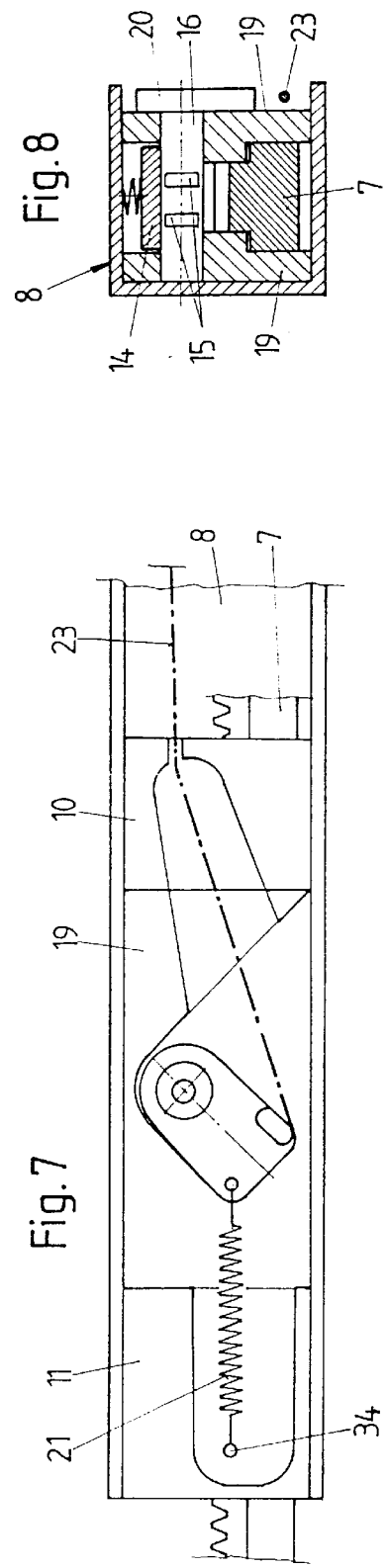

PULL-OUT DEVICE

BACKGROUND OF THE INVENTION

1. Field of the Invention

The present invention relates to a pull-out device which includes at least one carcass rail and at least one pull-out rail, with the carcass and pull-out rails forming together a rail pair, and a blocking device for retaining the carcass and pull-out rails in a respective relative position of the carcass rail and the pull-out rail, with the blocking device having at least one stationary tooth rack which extends parallel to the carcass and pull-out rails, and a tooth segment operatively connected with the at least one pull-out rail and engageable with the tooth rack for blocking displacement of the at least one pull-out rail relative to the at least one carcass rail.

2. Description of the Prior Art

U.S. Pat. No. 4,950,123 discloses a pull-out device of the type described above and used together with a cargo platform of a truck. The device provides for pulling the cargo platform rearward which facilitates loading of the cargo. The rear ends of the pull-out rails of this pull-out device are connected with a transverse spar. A pivotable lever is attached to the transverse spar. The lever is also connected with horizontal bolts which extend transverse to the pull-out device. The lever is actuated by an actuation rod which extends parallel to the pull-out device. The bolts, an end of which is located in respective bores formed in the vertical web of the pull-out rail, are displaced axially upon the pivotal movement of the lever. The respective carcass rail and an intermediate rail, which is also provided in this device, have each a bore into which the bolt can extend. Upon the bolt extending into these bores, the displacement of rails relative to each other is blocked. For the bolt to extend into the bores formed in the carcass and intermediate rails, these bores should be aligned with each other.

A pull-out device for a cargo platform of a truck, which is provided with a blocking device, is also disclosed in European Publication EP 314 172 A2. The blocking device includes spring-biased bolts and a tow bar for axially displacing the bolts into bores formed in the vertical web of the stationary carcass rail. The axially displaceable bolts are provided on the pull-out platform. When the tow bar is operated, the cargo platform should not move in order to insure the displacement of the bolts into the respective bores.

Austrian Publication A 2207/96 also discloses a spring-biased bolt operated by an actuation bar extending parallel to the pull-out rails. The bolt cooperates with a strip which is provided with an appropriate hole, is secured to the stationary carcass rail, and extends parallel to the carcass rail.

The pull-out devices are used in motor vehicles for pulling out the cargo platform. Such platforms are primarily used in ambulance vehicles and often carry heavy apparatuses and devices. When such platforms can be pulled-out, an access to these apparatuses and devices is noticeably facilitated. The workshop trucks likewise have a number of drawers which are loaded with heavy tools. In all these cases, it should be insured that the pull-out devices, which are, generally, easily displaceable, are not automatically displaced under action of accelerating forces generated during movement of a vehicle.

It also known to provide pull-out devices which are used with furniture, with devices which retain a pull-out furniture piece in a predetermined or desired position. One of such devices is disclosed in U.S. Pat. No. 3,700,301, with the device being associated with so-called ball guides. Above a ball guide, which connects a wall of a furniture carcass of a piece of furniture with the pull-out furniture piece, a toothed strip is secured to the furniture carcass wall. The pull-out furniture piece is provided with a toothed segment which is displaced by a pivotal level into and out of engagement wit the toothed strip. The lever has one of its ends displaceable in a vertical slideway. A switch rod provided to this end extends parallel to the toothed strip and is displaced against a spring biasing force. The switch rod is provided on the pull-out furniture piece. This blocking mechanism is unprotected from the environment and can only be used in closed spaces. This mechanism is not suitable for use in motor vehicles. If used in motor vehicle, this mechanism would be rapidly soiled and thereby damaged.

A construction, similar to that of U.S. Pat. No. 3,700,301, is also disclosed in U.S. Pat. No. 2,739,027. A bolt, which is arranged at one end of a pivotal bell-crank lever, is used as a locking member cooperating with a stationary tooth rack provided on furniture body. Opposite end of the bell-crank lever engages a switch rod which is supported on a pull-out rail and is displaceable against a biasing force of a spring. The blocking mechanism, which is disclosed in U.S. Pat. No. 2,739,027, is located between a carcass furniture wall and a side wall of the pull-out furniture piece and is likewise nor protected from the surrounding environment.

Finally, an appropriate blocking device for a pull-out mechanism of a tall cupboard is disclosed in U.S. Pat. No. 3,367,732. Here, for retaining the pull-out furniture piece in a predetermined pull-out position, there is provided a drive including a level wheel which is supported in a cantilever fashion and against which a stop is pressed by a spring force. This blocking mechanism is arranged beneath the bottom of the pull-out furniture piece and, thereby, is better protected from the environment than the previously described mechanisms. However, this construction is very expensive and did not find a practical application.

Accordingly, an object of the present invention is a pull-out device adapted to be used with motor vehicles and provided with a blocking device which is adequately protected against soiling and an outside mechanical action. Another object of the present invention is a blocking device of the above-described type which for reducing friction, is lubricated, with the lubricated parts being spaced from the region of the teeth engagement.

SUMMARY OF THE INVENTION

These and other objects of the present invention, which will become apparent hereinafter, are achieved by providing a first box-shaped rail having its rear end connected with the carcass rail, and a second profiled rail in which both the tooth rack and the tooth segment are received and which is telescopically displaceable in the box-shaped rail and has its front end connected with the at least one pull-out rail, with the tooth segment being arranged in the rear section of the second rail.

According to the present invention, the blocking device is automatically actuated upon actuation of the pull-out device, and performs its blocking function as soon as the pull-out device is released.

BRIEF DESCRIPTION OF THE DRAWINGS

The features and objects of the present invention will become more apparent, and the invention itself will be best understood from the following detailed description of the preferred embodiments when read with reference to the accompanying drawings, wherein:

FIG. 1 shows a plan view of a pull-out device according to the present invention;

FIG. 2 shows a cross-sectional view along line II—II in FIG. 1;

FIG. 3 shows a front elevational view of a pull-out device according to the present invention;

FIG. 4 shows a partially cross-sectional view along line IV—IV in FIG. 3;

FIG. 5 shows a longitudinal cross-sectional view of a blocking device used with a pull-out device according to the present invention in its initial blocking position;

FIG. 6 shows the blocking device in its non-blocking position;

FIG. 7 shows an elevational view of a blocking device used with a pull-out device according to the present invention;

FIG. 8 shows a cross-sectional view along line VIII—VIII in FIG. 5;

DETAILED DESCRIPTION OF THE PREFERRED EMBODIMENT

Figure 9:
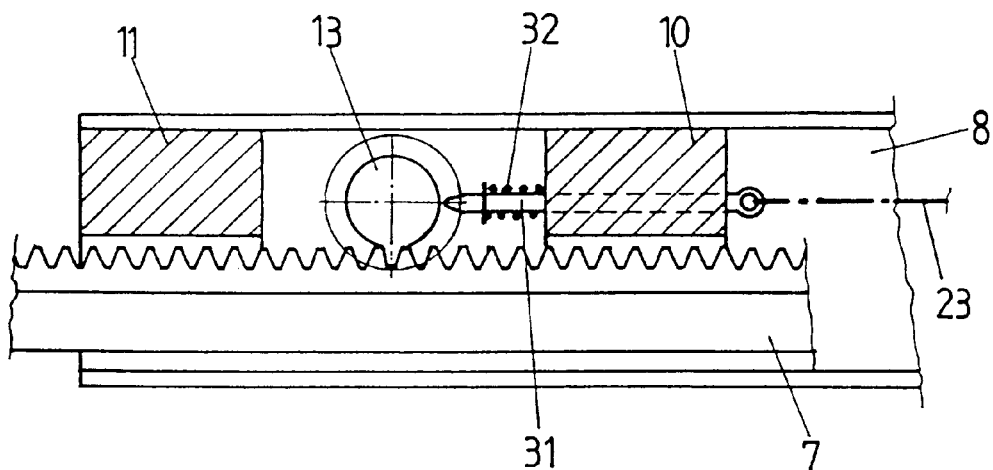
FIG. 9 shows a longitudinal cross-sectional view of another embodiment of a blocking device used with a pull-out device according to the present invention.

A pull-out device according to the present invention, a plan view of which is shown in FIG. 1, includes paired stationary carcass rails 1 along which pull-out rails 2 are displaced with an aid of appropriate roller means (not shown). The pull-out rail 2 can support, e.g., a cargo platform (not shown) of a vehicle. The distance between the rail pairs can be selected arbitrary and is not important for purposes of the present invention. Both pull-out rails 2, are connected, at their front end surfaces, with a front plate 3 which acts as a support for a U-shaped handle the opening width W of which corresponds somewhat to a width of a hand of a ground-up person.

A transverse spar 5 connects a box-shaped rail 6, which extends parallel to rails 1 and 2, with the carcass rails 1. A tooth rack 7, which is located in the box-shaped rail 6, has its rear end fixedly connected with the transverse spar 5. The front end of the tooth rack 7 projects into U-shaped rail 8 an open side of which faces one of the pairs of rails 1, 2. The tooth rack 7 extends over somewhat more than a half of a length L of the pull-out device.

In the rear section of the U-shaped rail 8, there are arranged two guides 10 and 11, which are shown in FIG. 1 with dash lines 9. The guides 10 and 11 are spaced from each other in the longitudinal direction and are fixedly connected with the rail 8, e.g, with screws (not shown). The guides 10 and 11 are formed as plastic blocks with tunnel-like openings 12, 22, respectively, through which the tooth rack 7 extends.

A rectilinear tooth segment 13 is arranged between the guides 10 and 11. The tooth segment 13 has an elongate opening 14 through which a shaft 16, which has a cam 15, extends. Two springs 18 are received in two, spaced from each other, blind bores 17 formed in the upper surface of the tooth segment 13. At their opposite ends, the springs 18 are supported against an inner wall of the U-shaped rail 8. The springs 18 push the tooth segment 13 downward. The pull-out device further includes side covers 19, which are appropriately connected to the U-shaped rail 8, for shielding the tooth segment 13. An end of the shaft 16 is connected with a crank-shaped bracket 20. A spring 21 engages the bracket 20. An opposite end 34 of the spring 21 is fixedly connected with the stationary guide 11. The position of the crank-shaped bracket 20, which is defined by the prestressed spring 21, is shown in FIG. 7 and corresponds to the position of the tooth segment 13 shown in FIG. 5. In addition, an end of a tow cable 23 is secured to the bracket 20. The tow cable 23 extends in the interior of the rail 8 and is guided about freely rotatable deflection rollers 24. The end of the tow cable 23 is secured to a lever 26 which is displaceably supported in the plane of the handle 4. The lever 26 is displaceable along the arrow 27.

In non-operational condition of the pull-out device, the spring 21 retains the bracket 20 in the position shown in FIG. 7, and the tooth segment 13 engages the stationary tooth rack 7, as shown in FIG. 5. In this position of the tooth segment 7, the pull-out device is blocked. The lever 26 at that overlaps a portion of the opening 28 of the U-shaped handle 4. The blocking device is in its active or blocking condition in each position of the carcass rails 1 and the pull-out rails 2. The pull-out device is actuated upon pulling of the handle 4. When the handle 4 is grasped by a hand, the lever 26, which occupies partially the handle opening 28, is pushed leftward (see FIGS. 3 and 4). This leads to shortening of the cable 23, resulting in pivotal movement of the bracket 20, together with the shaft 16. The cam 15 of the shaft 16 lifts the tooth segment 13 against the biasing force of springs 18, and the tooth segment 13 becomes disengaged from the tooth rack 7, as shown in FIG. 6 Only then, the pull-out device becomes operational. When the handle 4 is released, the spring 21 pulls the bracket 20, together with the shaft 16 in their initial position, and the tooth segment 13 again engages the tooth rack 7. The left cheek 29 of the U-shaped handle 4 has a shoulder 30 on which a person's thumb can be supported. This facilitates displacement of the lever. The thumb can be supported by either upper or lower shoulder 30. In the embodiment shown in FIGS. 5–7, the tooth segment 13 is formed as a rectilinear parallellopipedon-shaped component.

FIG. 9 shows an embodiment of a pull-out device according to the present invention in which the tooth segment 13 is formed as a freely rotatable pinion. The guide 10 has a bore, which extends parallel to the longitudinal extent of the rail 8, for receiving a pin-shaped locking bar 31 which is formlockingly engaged in a tooth space of the tooth segment 13 under the biasing force of the spring 32, blocking rotation of the pinion-shaped tooth segment 13. An end of the locking bar 31 is connected with a tow cable 23. The spring 32 functions similar to the spring 21 the functioning of which was described above. Both springs 21 and 32 provide for blocking of the pull-out device in its non-operational condition.

Figure 10:
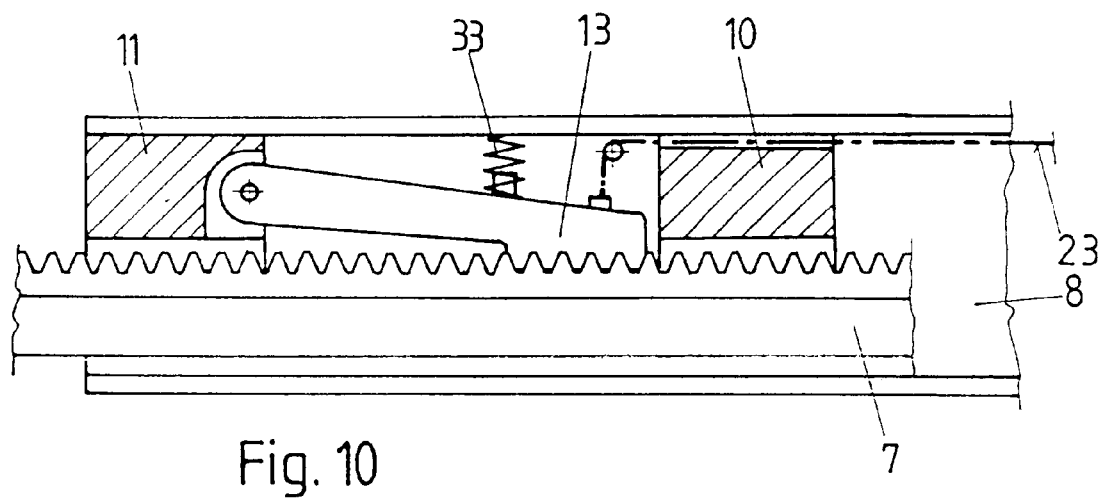
FIG. 10 shows a longitudinal cross-sectional view of yet another embodiment of a blocking device used with a pull-out device according to the present invention.

In the embodiment shown in FIG. 10, the tooth segment 13 is formed as a pivotally supported locking lever. The rear end of the tooth segment 13 is supported in the guide 11. The front end of the tooth segment 13 is connected with the cable line 23. The tooth segment 13, in this embodiment, is biased into engagement with the tooth rack 7 by a spring 33. In the embodiment of the pull-out device with a blocking device shown in FIGS. 5–7, the guides 10 and 11 with tunnel-like openings 12, 22 serve for guiding both the tooth segment 13 and the tooth rack 7. In the embodiments according to FIGS. 9 and 10, the guides 10 and 11 serve only for guiding of the tooth rack 7. In the embodiment according to FIG. 9, one guide, guide 10, serves for receiving a pin-shaped locking bolt 31. In the embodiment according to FIG. 10, one guide, guide 11, serves for receiving the pivot axle of the lever-shaped tooth segment 13. In this embodiment, the other guide, guide 10, serves for receiving the cable line.

The foregoing construction of a blocking device prevents it from contamination. The elements susceptible to possible oil or grease contamination are removed from the engagement area.

In the embodiments shown in the drawings, the axes of the teeth of the tooth segment and of the tooth rack extend substantially parallel to the plane of the pull-out device. However, whether these axes extend parallel to the plane of the pull-out device or not, is not important for purposes of the invention. Both the tooth rack 7 and the tooth segment 13 can be pivoted so that the axes of their teeth would extend substantially perpendicular to the plane of the pull-out device. It is also possible to connect an adjustable segment 13 with the carcass rail 1. In this case, the front end of the tooth rack is secured to the pull-out rail. The tooth segment 13 must be arranged in the front portion of the pullout device.

Though the present invention was shown and described with references to the preferred embodiments, various modifications thereof will be apparent to those skilled in the art and, therefore, it is not intended that the invention be limited to the disclosed embodiments or details thereof, and departure can be made therefrom within the spirit and scope of the appended claims.

What is claimed is:

1. A pull-out device, comprising at least one carcass rail and at least one pull-out rail, the carcass and pull-out rails forming together a rail pair; and a blocking device for retaining the carcass and pull-out rails in a respective relative position of the carcass rail and the pull-out rail, the blocking device having at least one stationary tooth rack which extends parallel to the carcass and pull-out rails, a tooth segment operatively connected with the at least one pull-out rail and engageable with the tooth rack for blocking displacement of the at least one pull-out rail relative to the carcass rail, a first box-shaped rail having a rear end thereof connected with the at least one carcass rail, and a second profiled rail telescopically displaceable in the box-shaped rail and having a front end thereof connected with the at least one pull-out rail, both the tooth rack and the tooth segment being located within the second rail, with the tooth segment being arranged in a rear section of the second rail.

2. A pull-out device as set forth in claim 1, comprising two carcass rails and two pull-out rails; and a front plate to which front ends of the two pull-out rails and the second rail are secured.

3. A pull-out device as set forth in claim 2, further comprising one of L-shaped and U-shaped handles secured to a front surface of the front plate, a lever displaceably arranged in a plane of the one of L-shaped and U-shaped handle and having one end thereof connected with a cable line and other end thereof operatively connected with the tooth segment.

4. A pull-out device as set forth in claim 3, wherein an inner width of the one of a L-shaped handle and a U-shaped handle corresponds approximately to a width of a hand of a grown-up person, and wherein the displaceable lever projects into an inner space of the one of a L-shaped handle and a U-shaped handle, reducing the inner width thereof.

5. A pull-out device as set forth in claim 2, wherein the tooth segment is formed as a freely rotatable pinion, and a blocking means comprising a cable-operated locking member for retaining the pinion against a rotation.

6. A pull-out device as set forth in claim 5, wherein the locking member is formed as a pin-shaped bar displaceable parallel to a longitudinal axis of the tooth rack.

7. A pull-out device as set forth in claim 1, wherein the blocking device further comprises longitudinally spaced guides arranged in the second rail, the tooth segment being adjustably supported between the guides, two springs for biasing the tooth segment into engagement with the tooth rack, and a shaft extending through the tooth segment and provided with a cam which lifts the tooth segment out of engagement with the tooth rack upon rotation of the shaft.

8. A pull-out device as set forth in claim 7, wherein the tooth segment has, at a side thereof remote from toothing, two spaced blind bores for receiving the two springs, with ends of the springs opposite the blind bores being supported against an inner wall of the second rail.

9. A pull-out device as set forth in claim 8, wherein the shaft is arranged between the two blind bores.

10. A pull-out device as set forth in claim 7, wherein the shaft is arranged in a longitudinally middle region of the tooth segment.

11. A pull-out device as set forth in claim 1, wherein the blocking device further comprises a tow cable extending parallel to the carcass and pull-out rails for effecting rotation of a shaft, the tow cable having one end thereof arranged in an end region of the pull-out rail and connected with a displaceable lever, the lever changing a relative length of the tow cable upon being displaced.

12. A pull-out device as set forth in claim 11, wherein the shaft has, at least at one end thereof, a crank-shaped bracket to which another end of the tow cable is attached.

13. A pull-out device as set forth in claim 12, further comprising a spring for biasing the crank-shaped bracket into a position in which the shaft occupies a position providing for engagement of the tooth segment with the tooth rack, the spring having one end thereof connected to the bracket an opposite end thereof connected to one of the second rail and one of the guides.

14. A pull-out device as set forth in claim 1, wherein the second rail has U-shaped cross-section.

15. A pull-out device as set forth in claim 1, wherein an open side of the second rail faces the pull-out rail.

16. A pull-out device as set forth in claim 1, wherein the tooth segment is formed as a cable-operated toothed locking member pivotable against a biasing force of a spring.

17. A pull-out device as set forth in claim 16, wherein a support axle of the toothed locking member extends perpendicular to a longitudinal axis of the tooth rack and parallel to plane of the pull-out device.

18. A pull-out device as set forth in claim 1, wherein the pull-out device comprises two, spaced from each other pairs of carcass and pull-out rails, and wherein the blocking device is arranged in a space between the two pairs of carcass and pull-out rails.

19. A pull-out device as set forth in claim 18, wherein the blocking device is arranged in a middle region of the space separating the two pairs of carcass and pull-out rails.

* * * * *